United States Patent [19]

Morita et al.

[11] Patent Number: 5,274,482
[45] Date of Patent: Dec. 28, 1993

[54] MATRIX ARRAY USING MIM DEVICE AND α AND β TANTALUM ELECTRODES

[75] Inventors: Hiroshi Morita, Kawasaki; Keiko Sunohara, Yokohama; Kazunari Nishimura, Suzuka, all of Japan

[73] Assignee: Kabushiki Kaisha Toshiba, Kawasaki, Japan

[21] Appl. No.: 796,248

[22] Filed: Nov. 21, 1991

[30] Foreign Application Priority Data

Nov. 21, 1990 [JP] Japan .................................. 2-314367
May 24, 1991 [JP] Japan .................................. 3-119973

[51] Int. Cl.⁵ .................... G02F 1/1343; H01L 27/02; H01L 29/46; H01L 29/88
[52] U.S. Cl. .......................................... 359/54; 359/87; 359/58; 257/30; 257/72; 257/761
[58] Field of Search .................. 359/58, 87, 54, 56, 359/57; 257/60, 30, 59, 61, 761, 72

[56] References Cited

U.S. PATENT DOCUMENTS

| 4,859,036 | 8/1989 | Yamanaka et al. | 359/58 |
| 5,000,545 | 3/1991 | Yoshioka . | |
| 5,107,355 | 5/1992 | Satoh et al. | 359/87 |
| 5,128,784 | 7/1992 | Suzuki et al. | 359/58 |

FOREIGN PATENT DOCUMENTS

| 57-205712 | 12/1982 | Japan . |
| 58-038923 | 3/1983 | Japan . |
| 63-296020 | 3/1989 | Japan . |
| 0120539 | 5/1989 | Japan . |
| 2251823 | 10/1990 | Japan . |

OTHER PUBLICATIONS

D. R. Baraff et al., "A 68 Line Multiplexed Liquid Crystal Display Using Metal-Insulator-Metal (MIM) Devices", Proceedings of SID '80, 707 (1980).
Molecular Crystals and Liquid Crystals, vol. 193, Dec. 1990, Chur, CH pp. 1-5; A. Smirnov et al. 'High multiplexed MIM-addressed CSD'.

*Primary Examiner*—William L. Sikes
*Assistant Examiner*—Kenneth Parker
*Attorney, Agent, or Firm*—Cushman, Darby & Cushman

[57] ABSTRACT

According to the present invention, there is provided a matrix array substrate for a liquid crystal display device comprising a transparent substrate, a plurality of picture element electrodes formed on said transparent substrate and made of a transparent conductive material, and non-linear resistive devices formed on said transparent substrate, and each connected to each of the picture element electrodes. Each of said non-linear resistive devices includes a Ta first electrode formed on said transparent substrate, a second electrode, and an insulating layer located between the first and second electrodes, and the first electrode is connected to another non-linear resistive device via a Ta interconnecting layer. Further, a transparent conductive layer is formed between said transparent substrate and interconnecting layer and is not formed between the transparent substrate and the first electrode.

12 Claims, 4 Drawing Sheets

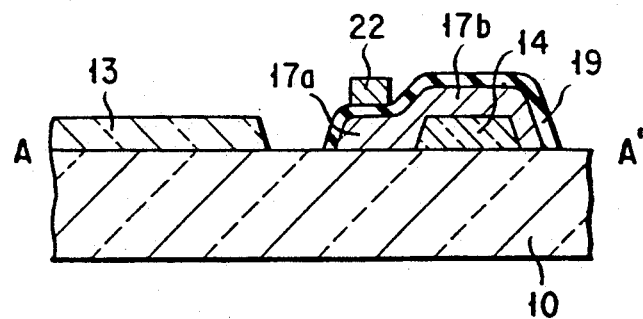
F I G. 4
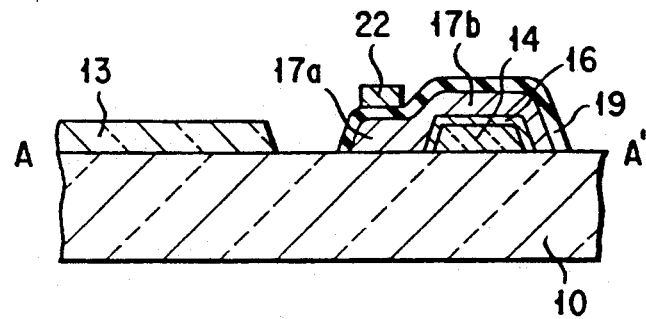
F I G. 5

MATRIX ARRAY USING MIM DEVICE AND α AND β TANTALUM ELECTRODES

BACKGROUND OF THE INVENTION

1. Field of the Invention

The present invention relates to a matrix array substrate including a non-linear resistive device, more specifically to an MIM (Metal-Insulator-Metal) element, serving as a switching device, and a method of manufacturing the same.

2. Description of the Related Art

Recently, liquid crystal display devices have used in relatively simple devices such as watches, calculators, various types of measuring instruments, and even in devices handling a great amount of data such as office automation terminal devices and television sets. In the field of the liquid crystal devices, improvement of the quality of images has been of the greatest interest. Presently, there are many types of switching arrays proposed for those devices. Of all the types, the one with a bi-terminal non-linear resistive device is very popular because of its simple structure and easy assembling procedure, and more specifically, an MIM type element array can be provided for its present commercial success.

FIG. 1 is a cross section of a pixel of an array substrate having an MIM element, and the MIM element is produced as follows:

A Ta film 2 is formed on a glass substrate by a thin film formation method such as sputtering or vacuum deposition, or the like. Then, the Ta film 2 is patterned by a photo-lithography, thereby forming a wiring and one of the two electrodes of an MIM element. After that, the surface of the Ta film 2 is oxidized in an aqueous solution of citric acid by the anodic oxidation method, forming an oxide film 3. Further, a Cr film 4, which serves as the other electrode, is formed by the thin film formation method, thereby completing an MIM element. Lastly, a transparent picture element electrode 5 for image display is formed such that it is connected to the MIM element.

A basic technique of manufacturing such an array substrate is disclosed in Published Examined Japanese Patent Application (PEJPA) No. 1-35352, and a remodeled version of this technique is set forth in Published Unexamined Japanese Patent Application (PUJPA) No. 58-35352.

In conventional MIM elements, as set forth in PEJPA No. 1-35352, the same metal is used for one of the electrodes and the wiring. Consequently, it is not always assured that a material having a small electric resistance is used. Although the β-type tantalum widely used is an excellent material for an MIM element, it has a high resistance. If the resistance of a wiring electrode is high, the waveform of a driving pulse applied from an external drive circuit is distorted. As a result, deterioration and decline of contrast occurs due to lack of writing. Especially, in the case where a display screen or display capacity is large, the width and length of the wiring become(narrow and long, rendering the above problem worse. Thus, in order to produce a device of a high performance, which can display a uniform image, it is essential in a practical sense that the resistance of the wiring electrode is reduced to a certain level.

However, if different metals are used for the one of the electrodes of the MIM element, and the wiring electrode, some additional steps are required. Such addition of steps complicate the manufacturing procedure. Therefore, the reduction of the resistance must be achieved by a slightest possible modification to the conventional materials and procedure.

SUMMARY OF THE INVENTION

It is an object of the present invention to provide a matrix array substrate in which the resistance of the wiring electrode can be lowered by using similar materials to those of the conventional technique, and without providing additional lithography steps thereto.

It is another object of the invention to provide a method of manufacturing such a matrix array substrate.

According to the present invention, there is provided a matrix array substrate for a liquid crystal display device, comprising a transparent substrate, a plurality of picture element electrodes formed on said transparent substrate and made of a transparent conductive material, and non-linear resistive devices formed on said transparent substrate, and each connected to each of the picture element electrodes, wherein each of said non-linear resistive devices includes a Ta first electrode formed on said transparent substrate, a second electrode, and an insulating layer located between the first and second electrodes, said first electrode being connected to another non-linear resistive device via a Ta interconnection layer, and a transparent conductive layer is formed between said transparent substrate and interconnection layer and is not formed between the transparent substrate and the first electrode.

Further, according to the invention, there is also provided a method of preparing a matrix array substrate for a liquid crystal display device comprising the steps of forming a transparent conductive layer on a transparent substrate, forming a plurality of picture element electrodes and transparent conductive layers by patterning said transparent conductive interconnection layer, forming Ta first electrodes on regions of said transparent substrate where said non-linear resistive devices are to be formed, and Ta metal interconnection layers on said transparent conductive interconnection layers, forming insulating layers on said first electrodes, and forming second electrodes connected to said picture element electrodes, on said insulating layer, wherein said first electrodes, insulating layers, and second electrodes constitute the non-linear resistive devices, and are connected with each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a cross sectional view showing the completed device according to the first embodiment of the present invention;

FIG. 5 is a cross sectional view showing the completed device according to the second embodiment of the present invention.

DETAILED DESCRIPTION OF THE PREFERRED EMBODIMENTS

Figure 1:
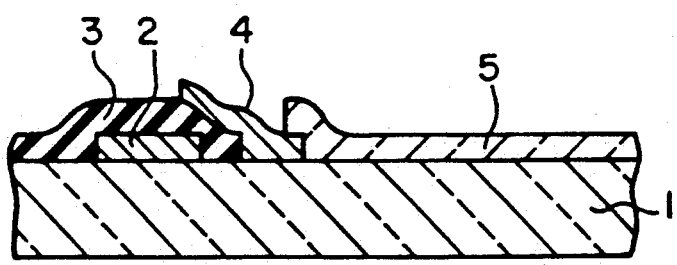
FIG. 1 is a cross sectional view showing a single picture element portion of a conventional matrix array substrate.

In the matrix array substrate of the present invention, one of the electrodes, i.e. the first electrode, of the non-linear resistive device (MIM element), and the interconnection layer connected to the electrode are both made of tantalum, and a transparent conductive layer, for example, ITO (indium-tin oxide) film is provided underneath this interconnection layer.

The thickness of the Ta layer should preferably be in the range between 2000Å and 4000Å, and the thickness of the transparent conductive layer should be preferably be in the range between 500Å and 1500Å.

The other one of the electrodes, i.e., the second electrode, of the MIM element can be any one selected from the group of Ti, Mo, Al, Ag, and Cr. It should be noted here that Ta, as used in the first electrode, may be used also for the second electrode. The insulation layer located between the first and second electrodes can be formed by anodic oxidation of the first electrode.

The transparent conductive layer located underneath the interconnection layer can be prepared by patterning the transparent conductive layer formed on the entire surface of the substrate. This preparation is carried out at the same time as the formation of the picture element electrode connected to the other electrode (the second electrode) of the MIM element, before the formation of the Ta layer, and is not regarded as an additional complex exposing step.

The Ta film formed on the transparent conductive layer exhibits properties similar to those of the $\alpha$ type crystal system (hexagonal crystal system) having a very low resistance, and this fact was experimentally proved as will be set forth later. Thus, formation of a transparent conductive layer underneath the interconnection layer influences the interconnection layer to reduce its resistance. Consequently, display with a large capacity, and fine quality can be achieved.

In the meantime, underneath the other electrode of the MIM electrode, no transparent conductive layer is formed; therefore the Ta film is of the $\beta$ type crystal system (tetragonal crystal system). Consequently, structural change ($\beta$-Ta$\rightarrow\alpha$-Ta) does not occur in Ta which construct the other one of the electrodes of the non-linear resistive device. Thus, excellent MIM properties can be expected from this device.

Further, as a display area enlarges and displayed image becomes finer, the interconnection layer inevitably becomes narrower and longer, in which case, the resistance thereof should be further decreased, according to a general technique. However, the inventors of the present invention has discovered that when a simple metal layer is formed on the ITO film by a plating method, the $\alpha$ type of tantalum of the layer formed thereon is further prominent, and therefore, the resistance of an interconnection layer is remarkably reduced due to not only the metal layer, but also the type of tantalum. Here, it should be noted that the plating layer is formed only on the interconnection section of the ITO film, and there should be no plating layer underneath the Ta layer which constructs the other one of the electrodes of the MIM element. An MIM element, the first electrode of which is made of $\alpha$ type Ta, has a problem of large leak current, which causes deterioration of the switching property; therefore a pattern in which a section of the ITO film corresponding to the interconnection area is removed in advance, is first formed, the film is plated on the ITO film pattern, and then a pattern of the Ta layer is formed. With the above mentioned procedure, a matrix array substrate including an interconnection electrode of a lowered resistance, and having an MIM property equivalent to the conventional ones, can be prepared.

The inventors of the present invention conducted experiments to analyze crystal types of the tantalum layer formed on a various kinds of substrates. The following are the results of the experiments.

SAMPLES

A: A substrate having a structure in which a Ta film having 3,000 angstrom is formed on a glass substrate by a sputtering method.

B: A substrate having a structure in which an ITO film having 3,000 angstrom is formed on a glass substrate by a sputtering method, and then a Ta film having 3,000 angstrom is formed on the ITO film by a sputtering method.

C: A substrate having a structure in which an ITO film having 3,000 angstrom is formed on a glass substrate by a sputtering method, an Ni film having 1,000 angstrom is formed thereon by an electrolytic plating method, and a Ta film having 3,000 angstrom is formed thereon by a sputtering method.

Crystal structure of the Ta film:
Sample A : $\beta$- Ta
Sample B : $\alpha$- Ta (with a little bit of $\beta$- Ta mixed therein
Sample C : $\alpha$- Ta Resistivity of Ta film (influence of ITO and Ni has been subtracted by calculation)
Sample A : 160-180 $\mu\Omega$.cm
Sample B : 50-100 $\mu\Omega$.cm
Sample C : 35-50 $\mu\Omega$.cm In order to prepare a liquid crystal element of a finer image and higher quality than that of the conventional element of a 12-inch type, i.e., an element having a picture element pitch of $\frac{1}{3}$ that of the conventional one, the resistivity of its interconnection layer need to be 60 $\mu\Omega$.cm or less.

Elements having a similar structure and size to that of an embodiment described later, can be prepared by anodic oxidation of the Ta films using the mentioned samples, and the MIM element characteristics $I_{off}$(current flowing at 4 V, the lower, the better) thereof:
Sample A : to $10^{-13}$ A
Sample B : to $10^{-10}$ A
Sample C : to $10^{-10}$ A In order to prepare an element exhibiting a contrast twice as much as that of a conventional liquid crystal display element of a 12-inch type $I_{on}/I_{off}$ should be about $10^5$, where I on is usually $10^{-8}$.

Further, the present invention has a structure in which a transparent conductive layer is underneath the Ta interconnection layer; therefore even if some disconnection occurs within the interconnection layer, it can be recovered by the ITO film patterned for such a recovery. Further, formation of the picture element electrode and the ITO film is carried out prior to the formation of the Ta layer, and such a procedure makes formation of a film at a high temperature, and patterning thereof with a strong etchant, possible. This is another advantage of the invention in terms of process of the element.

As the plating layer, which is an underlying layer for the Ta layer, many kinds of electrolytic plating metals of those which can be formed on the ITO film of the interconnection portion, and some of the examples are single metals such as Cu, Ni, Cr, Zn, Sn, Au, Ag, etc., or alloys such as Cu—Zn, Sn—Co, Fe—W, Co—W, Fc—Mo, Fe—Ta, Ni—P, Ni—Ta, etc. Besides these metals and alloys, laminated layers of the mentioned ones exhibit a similar effect.

The following are explanations of preferred embodiments of the present inventions with reference to drawings.

Figure 2A:
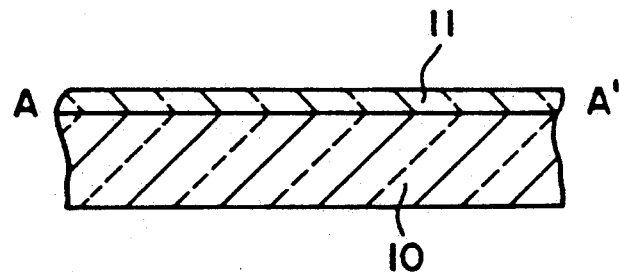
FIGS. 2A-2H are cross sectional views showing steps of manufacturing a matrix array substrate, according to a first embodiment of the present invention.
Figure 2B:
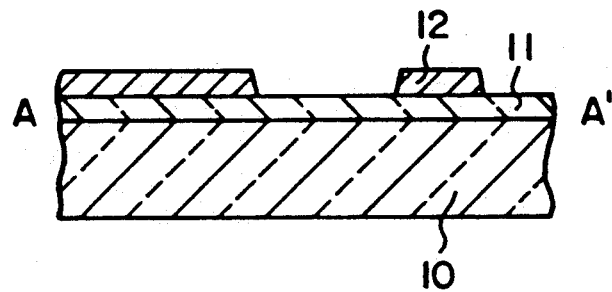
Figure 2C:
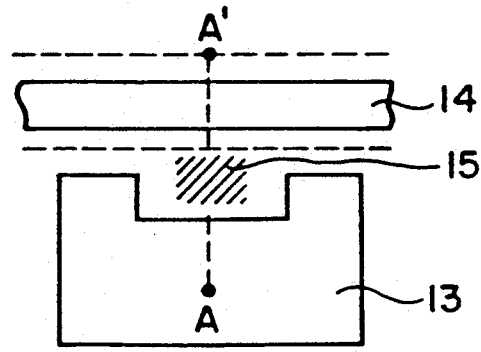
Figure 2D:
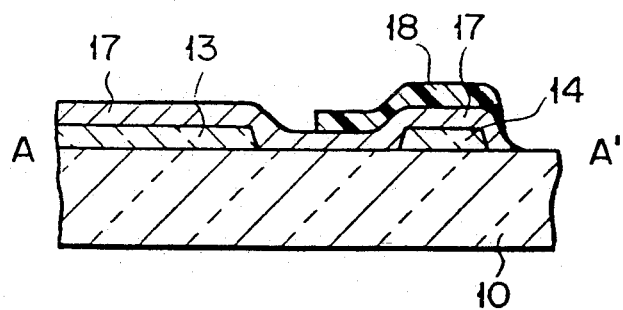
Figure 2E:
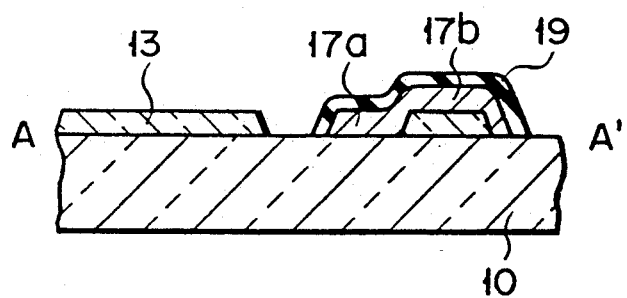
Figure 2F:
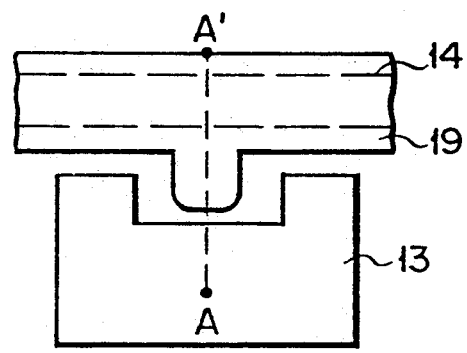
Figure 2G:
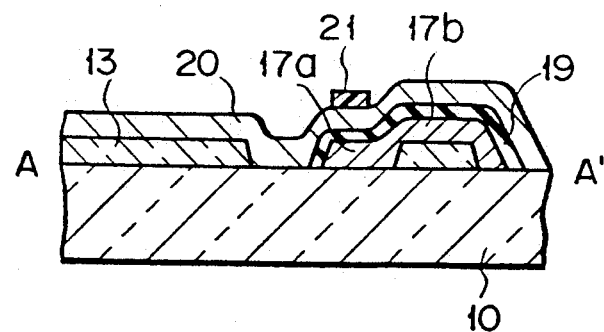
Figure 2H:
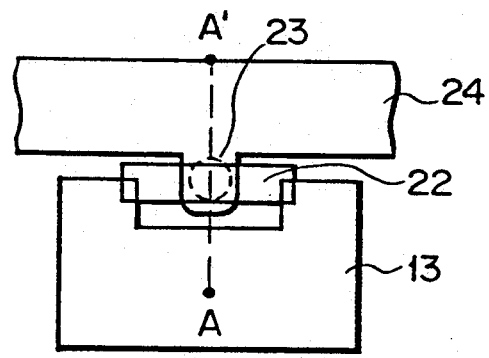

FIGS. 2A-2H illustrate steps for manufacturing a matrix array substrate according to an embodiment of the invention. FIGS. 2A, 2B, 2D, 2E, and 2G show cross sections of the substrate plan views of which are shown in FIGS. 2C, 2F, and 2H, along the line A—A'.

First, as can be seen FIG. 2A, a transparent conductive layer 11 made of, for example, a 1,000Å-thick ITO film is formed on a transparent substrate 10 made of a 1.1 mm-thick glass, with an alkali-protection film (not shown) of, for example, SiO₂ provided on a surface thereof, by a sputtering method. During this step, the temperature of the substrate is raised up to 250° C to enhance the transmissivity thereof, and sufficiently lower the resistance for a better etching processability. With the conventional techniques in which a picture element electrode is formed after formation of a device, the above-described step is impossible to perform appropriately because the device is damaged by heat. Therefore, in the conventional techniques, the substrate is heated only up to about 180° C. to avoid a possible obstacle to stabilization of the film quality.

Next, as shown in FIG. 2B, after a resist (photosensitive resin) is applied on the entire surface of the transparent conductive layer 1, this layer 1 is exposed using a photomask. The layer 1 is then developed to obtain a resist pattern 12. The resist pattern 12 is formed on the transparent conductive layer 11 at the sections where a picture element electrode and an interconnection are to be formed, not at the section where a device is to be formed.

Then, water, hydrochloric acid, and nitric acid are mixed at the ratio of 1:1:0.1 (by volume) to prepare an etching solution. The etching solution is warmed up to 30° C., and with this solution, the transparent conductive layer 11 is etched using the resist pattern 12 as a mask. Thus, a picture electrode 13 and wiring layer 14 having the same pattern as the resist pattern 12 are prepared as is shown in FIG. 2C. After that the resist pattern 12 is removed. As shown in FIG. 2C, the shaded region, denoted by reference numeral 15 is the region on the transparent substrate 10 where an MIM device is to be formed.

Following the above, a tantalum film 17 having the thickness of 0.3 μm is formed by a sputtering method as can be seen FIG. 2D. After applying a resist on the entire surface of the Ta layer 17, this resist film is exposed using a photomask. The resist film is then developed to obtain a resist pattern 18. Further, as shown in FIG. 2E, the Ta film 17 is etched using the resist pattern 18 as a mask. This etching is conducted in a plasma of a mixture gas of CF₄ and O₂ at an equivalent amount.

After this etching, the Ta film 17 is patterned, and the edge of this pattern is shaped into a taper-like slope. It has been proved that the picture element electrode 13 and wiring layer 14 which have been already made are not etched, or change their properties during this etching. When the Ta film 17 is patterned into the first electrode 17a of the MIM element, an interconnection 17b is connected thereto.

After removing the resist pattern 18, anodic oxidation treatment is carried out in a acidic electrolytic solution (0.05 weight % citric acid solution) using the Ta films 17a and 17b as anodes. During this treatment, and an insulation layer 19 having an appropriate thickness is formed on the upper and side surfaces of the Ta layers 17a and 17b by controlling the voltage applied in the solution. In this embodiment, an voltage of 42 volts is applied, and the insulation layer 19 of the thickness of 700Å is thus obtained. On that surface of the Ta films 17a and 17b which are exposed to the electrolytic solution, and the 280Å-thick Ta surface portions thereof are changed into 700Å-thick Ta₂O₅ surface portions.

Thereafter, as can be seen in FIG. 2G, a Ti film 20 having the thickness of 1500 angstrom is formed on the entire surface of the product. After applying a resist (photosensitive resin) on the product, this product is exposed using a photomask, and developed to obtain a resist pattern 21. Then, the etching solution prepared by mixing 9 g of EDTA (ethylene diamine tetra aceticazide), 400 cc of water, 216 cc of hydrogen peroxide solution, and 30 ml of ammonia solution, is used to etch the Ti film 20 at room temperature using the resist pattern as a mask, to obtain the second electrode 22 of the MIM element, as shown in FIG. 2H. Lastly, the resist of the surface portion is removed.

Thus, as shown in FIGS. 2A-2H and 4, a matrix array substrate is completed, and such a matrix array substrate has a structure in which MIM elements (non-linear resistive devices) 23 each of which has a metal-insulator-metal lamination, i.e., Ta film 17a—insulation layer 19—Ti film 20, are arrayed on the transparent substrate 10, and a picture element electrode 13 is arranged in series to each of the nonlinear resistive devices 23, and the lines of the array are connected with each other by the interconnection electrode 24 made of a laminate of the transparent conductive layer 14 and the Ta film 17b, and so are the columns thereof.

In this embodiment, since at least a part of the Ta film 17b constituting the interconnection electrode 24 is formed on the transparent conductive layer 14, the resistance of the product is lower than that of the conventional techniques in which layers are directly formed on a glass substrate. Since the transparent conductive layer 14 is not present at the region of the nonlinear resistive devices 23, that is, underneath the Ta layer 17a which is the first electrode of the non-linear resistive devices 23, the MIM characteristics can be maintained at an excellent level. Further, the interconnection electrode 24 has a double-layered structure made of the transparent conductive layer 14 and the Ta film 17b; therefore disconnection is less likely to take place than the case of an array of a Ta single layer structure.

Further, in order to manufacture a matrix-type liquid crystal display device from the matrix array substrate obtained as above, the following procedure may be suggested.

First, a orientation film made of a polyimide resin is further applied on the non-linear-resistive-device-formed surface of the matrix array substrate, followed by sintering. The orientation film is then rubbed to regulate the orientation of the liquid crystals. In the meantime, a common electrode made of, for example, ITO, is formed on a substrate made of, for example, the same glass as used as the matrix array substrate, and at the same time, an opposed substrate in which the direction of the liquid crystal orientation is regulated by an orientation film made of polyimide resin, and rubbing, is prepared. Then, the matrix array substrate and the opposed substrate are supported to have an interval of 5-20 μm therebetween so that the liquid crystals, injected therebetween, can be twisted by about 90° as regards the longitudinal direction of the molecules of the liquid crystals from the matrix array substrate to the opposed substrate. Outside thus structured liquid crystal cell, there are provided two polarized plate the polarization axis of each of which is twisted by about 90°.

The following is an explanation of another preferred embodiment according to the present invention.

This embodiment has the same structure as the first one except that a metal plate layer is formed on the surface of the transparent conductive layer 14, and becomes one of the elements of the interconnection electrode 24 besides the Ta layer 17b. Explanations of the same sections will be omitted here.

Figure 3:
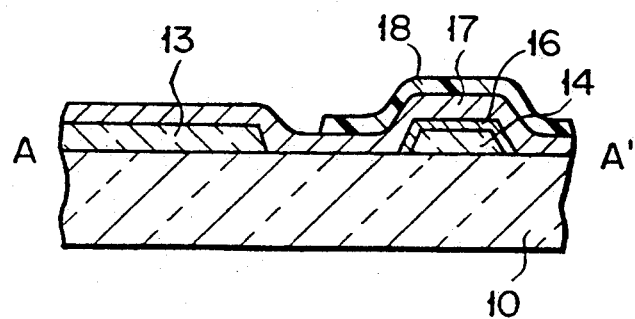
FIG. 3 is a cross sectional view showing one step of manufacturing a matrix array substrate procedure according to a second embodiment of the present invention.

In this embodiment, electrolytic plating is carried out on the product having the structure shown in FIG. 2C in a plating solution prepared by mixing nickel nitride, nickel chloride, and boric acid (note that ITO film formed at a high temperature has a great resistance), thereby forming a metal thin film 16, formed of, for example, Ni on the transparent conductive layer 14, as shown in FIG. 3.

Thus, a matrix array substrate as shown in FIGS. 2H and 5 is completed, and such a matrix array substrate has a structure in which MIM elements (non-linear resistive devices) 23 each of which has a metal-insulator-metal lamination, i.e., Ta film 17a—insulation layer 19—Ti film 20, are arrayed on the transparent substrate 10, and a picture element electrode 13 is arranged in series to each of the non-linear resistive devices 23, and the lines of the array are connected with each other by the interconnection electrode 24 made of a laminate of the transparent conductive layer 14 and the Ta film 17b, and so are the columns thereof.

In this embodiment, in which at least a part of the interconnection electrode 24 includes the transparent conductive layer 14 and the metal thin film layer 16, the resistance of the interconnection electrode 24 can be made lower than that of the conventional techniques. Since the transparent conductive layer 14 and the metal thin film 15 are not present at the region of the nonlinear resistive device 23, the MIM characteristics can be maintained at an excellent level. Further, the interconnection electrode 24 has a triple-layered structure made of the transparent conductive layer 14, metal thin film layer 16, and the Ta film 17b; therefore disconnection is less likely to take place than the case of an array of a Ta single layer structure.

The present invention has realized lowering of the resistance of the interconnection electrode easily without deteriorating the characteristics of the non-linear resistive device, and is very advantageous when employed in matrix-type liquid crystal display devices of a large scale and fine images.

Additional advantages and modifications will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents.

What is claimed is:

1. A matrix array substrate for a liquid crystal display device comprising:

a transparent substrate;

a plurality of picture element electrodes formed on said transparent substrate and made of a transparent conductive material; and non-linear resistive devices formed on said transparent substrate, and each connected to each of the picture element electrodes;

wherein each of said non-linear resistive devices includes a $\beta$- Ta first electrode formed on said transparent substrate, a second electrode, and an insulating layer located between the first and second electrodes, said first electrode being connected to another non-linear resistive device via a $\alpha$- Ta interconnection layer formed on a transparent conductive layer, the $\alpha$- Ta interconnection layer being formed by a structural change of $\beta$- Ta to $\alpha$-Ta due to deposition of the $\beta$- Ta on the transparent conductive layer is formed between said transparent substrate and the $\alpha$- Ta interconnection layer and is not formed between the transparent substrate and the first electrode.

2. A matrix array substrate according to claim 1, wherein said second electrode is a metal selected from the group consisting of Ti, Mo, Al, Ag, Cr and Ta.

3. A matrix array substrate according to claim 1, wherein said insulating layer is tantalum oxide formed by anodic oxidation of the first electrode.

4. A matrix array substrate according to claim 1, wherein said transparent conductive material is indium-tin oxide.

5. A matrix array substrate according to claim 1, wherein a metal layer is formed on the transparent conductive interconnection layer.

6. A matrix array substrate according to claim 1, wherein said metal layer is a metal selected from the group consisting of Cu, Ni, Cr, Zn, Sn, Au, Ag, Cu-Zn alloy, Sn—Co alloy, Fe—W alloy, Co—W alloy, Fe—Mo alloy, Fe—Ta alloy, Ni—P alloy, Ni—Ta alloy and a laminated body thereof.

7. A method of preparing a matrix array substrate for a liquid display device comprising the steps of:

forming a transparent conductive layer on a transparent substrate;

forming a plurality of picture element electrodes and transparent conductive interconnection layers by patterning said transparent conductive layer;

forming a Ta film on the entire surface of the resultant structure, the Ta film on the transparent substrate being substantially $\beta$- type Ta, and the Ta film on the picture element electrodes and the transparent conductive interconnection layers being substantially $\alpha$- type Ta, said $\alpha$- type Ta being formed by a structural transformation of $\beta$- type Ta to $\alpha$- type Ta due to the deposition of the Ta on the transparent conductive interconnection layer;

patterning said Ta film to form a first electrode consisting of substantially the $\beta$- type Ta on regions of said transparent substrate where said non-linear resistive devices are to be formed, and interconnection layers consisting substantially of the $\alpha$- type Ta on said transparent conductive interconnection layers;

forming insulating layers on said first electrodes; and forming second electrodes connected to said picture element electrodes, on said insulating layer;

wherein said first electrodes, insulating layers, and second electrodes constitute the non-linear resistive devices, and the non-linear resistive devices are connected with each other.

8. A method of preparing a matrix array substrate according to claim 7, wherein said step of forming insulating layers on said first electrodes is carried out through anodic oxidation of surfaces of said first electrodes and Ta interconnection layer.

9. A method of preparing a matrix array substrate according to claim 7, wherein said second electrode is a metal selected from the group of Ti, Mo, Al, Ag, Cr, and Ta.

10. A method of preparing a matrix array substrate according to claim 7, wherein said transparent conductive layer is formed of indium-tin oxide.

11. A method of preparing a matrix array substrate according to claim 7, further comprising the step of forming metal layer on surface of said transparent conductive interconnection layer.

12. A method of preparing a matrix array substrate according to claim 11, wherein said step of forming said metal layer is carried out by electrolytic plating said transparent conductive interconnection layer with a metal selected from the group consisting of Cu, Ni, Cr, Zn, Sn, Au, Ag, Cu—Zn alloy, Sn—Co alloy, Fe—W alloy, Co—W alloy, Fe—Mo alloy, Fe—Ta alloy, Ni—P alloy, Ni—Ta alloy and a laminated body thereof.

* * * * *